United States Patent [19]

Sides et al.

[11] 3,934,688

[45] Jan. 27, 1976

[54] SHIFTER MECHANISM

[75] Inventors: Daniel Harrison Sides, New Freedom, Pa.; William D. Sauerwein, Joppa, Md.

[73] Assignee: The Black and Decker Manufacturing Company, Towson, Md.

[22] Filed: Sept. 11, 1974

[21] Appl. No.: 505,042

[52] U.S. Cl. ............... 192/48.5; 64/30 C; 74/527; 192/67 R; 192/89 A; 192/99 S
[51] Int. Cl.² F16D 47/00; F16D 7/02; F16D 11/04
[58] Field of Search ......... 64/30 R, 30 C; 192/48.5, 192/67 R, 89 A, 93 R, 99 S; 74/527

[56] References Cited
UNITED STATES PATENTS

| | | | |
|---|---|---|---|
| 1,299,258 | 4/1919 | Strite | 192/89 A X |
| 2,623,618 | 12/1952 | Howard | 192/48.5 |
| 2,675,835 | 4/1954 | Kiekhaefer | 192/48.5 X |
| 2,751,740 | 6/1956 | Fergason | 192/67 R X |
| 2,830,864 | 4/1958 | Pulaski | 74/527 X |
| 3,073,180 | 1/1963 | Lohr | 64/30 R X |
| 3,178,956 | 4/1965 | Stanley | 192/89 A X |
| 3,396,557 | 8/1968 | Moores, Jr. | 192/93 R X |
| 3,763,979 | 10/1973 | Goodman et al. | 192/89 A |
| 3,860,102 | 1/1975 | Hosemann | 192/89 A X |

*Primary Examiner*—Allan D. Herrmann
*Attorney, Agent, or Firm*—William Kovensky; Joseph R. Slotnik; Edward D. Murphy

[57] ABSTRACT

An improved shifter mechanism for the transmission of a power tool in which the operating lever can be located to either side of the transmission housing. The operating rod has a flat which operates one end of a pivoted shift member, the other end of which moves a clutch member to engage or disengage a rotation clutch. The shifter provides positive action, a long throw, and permits operation in either direction. The clutch itself includes an improved lubrication feature and improved mounting of the fixed clutch member to the armature shaft.

32 Claims, 7 Drawing Figures

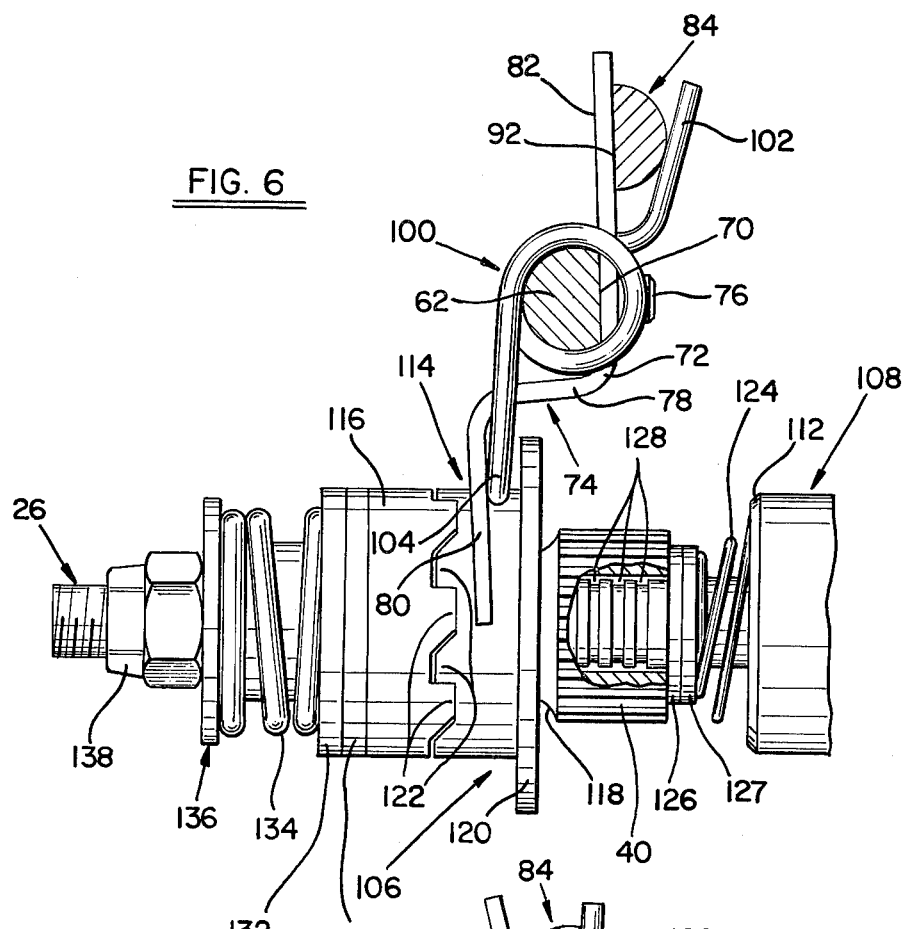
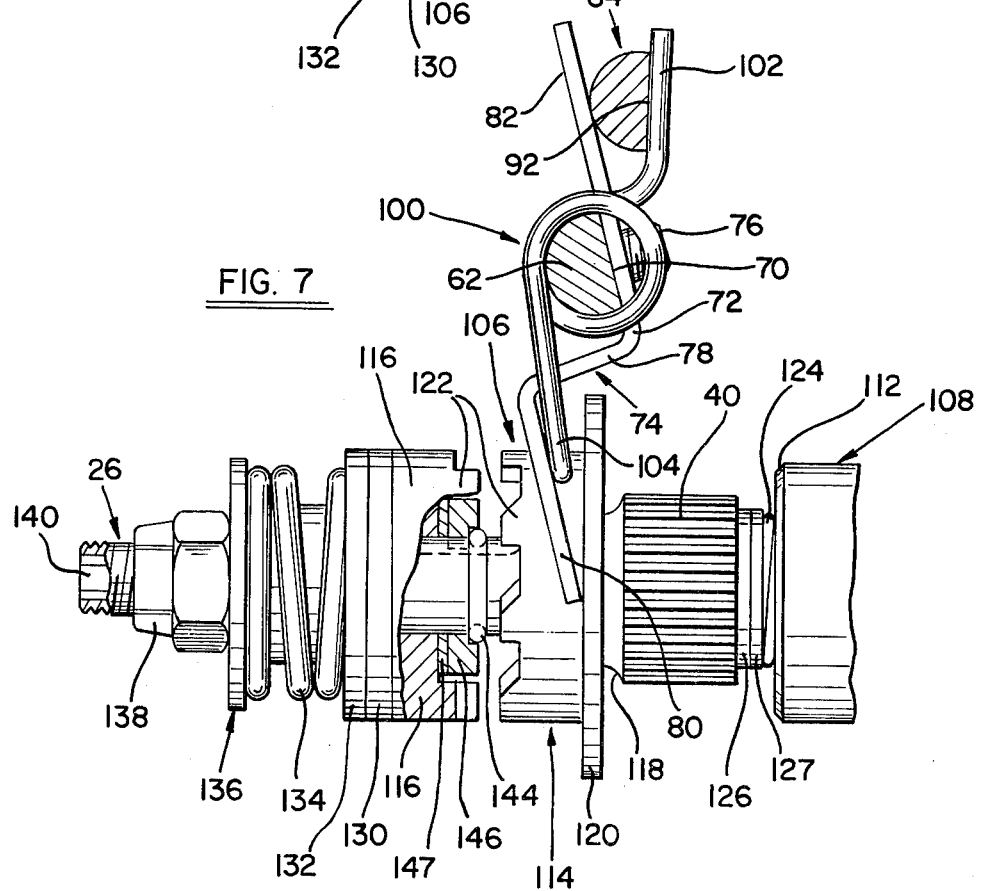

SHIFTER MECHANISM

This invention pertains to a shift mechanism. More particularly, the invention pertains to a combined gear shifter and slip clutch. Still more particularly, the invention pertains to such a combined mechanism for use as stop rotation means in an electrical rotary hammer.

In its most general application, the invention could be used anywhere it is desired to mechanically move an inaccessible enclosed member by means of an external handle or lever. The invention is particularly suitable to applications in which space is at a premium, such as gear cases generally, and particularly the transmissions of electrical tools. Along this general line, in addition to the environment of power tools for which it was developed, the invention could also be used in self-propelled lawn mowers, chain saws, or other applications including power trains.

Stop rotation mechanisms in hammers are known in the prior art. For example, in U.S. Pat. No. 3,430,708 to Daniel A. Miller, assigned to the same assignee as the present invention, there is shown a shift mechanism for disengaging a clutch to stop the rotation. A problem with this and many other clutches in the art is that the clutch remains disengaged only so long as the operating member is held depressed. That is, there are no positive clutch engaged and clutch disengaged positions. Another problem with this and many other shift mechanisms is the relatively poor location of the operating member and/or the difficulty of determining the condition of the operating member. Push buttons are located sometimes at the front face of the tool, at the top of the tool, and at other locations less desirable than the side locations of the present invention. Further, certain of these operating members, knobs and dials in particular, are difficult to "read" by a quick visual inspection. That is, one could look at the operating member and not be apprised at a glance of the tool's mode of operation. In the present invention, the shift mechanism operating member is located to the side of the housing, and is in the form of a lever. By simply observing whether the lever is pointing up or pointing down the operator is immediately apprised of the operating mode of the tool.

Another important advantage of this shift lever is that it is amenable, by an extremely simple adjustment, to being located on either the left side or the right side of the housing, to thereby accommodate the convenience and preference of both righthanded and lefthanded users. This particular advantage is totally unknown in the state of the art and the prior art, and is an important step forward for the present invention. The prior art attempted to accommodate righthandedness and lefthandedness by locating the operating member in a central position, such as on the top of the tool. Such a location is at best a compromise, and does not fully satisfy either righthanded or lefthanded persons.

The invention has a number of important advantages either not found in or not strongly emphasized in various prior art shifters. Among these advantages are that the operator experiences a strong feedback or detent force on the operating lever. This makes the tool phychologically more comfortable to use as opposed to other prior art "soft" mechanisms in which the feel is "mushy". Another advantage of the invention mechanism is that a positive lock or "home" position is provided in both the engaged and disengaged positions. Because of this feature, the invention shifter is much less susceptible to accidental operation than are some prior art shifters of the character described above. That is, with a strong detent force as a positive lock to both positions, it is highly unlikely that the operator will accidentally throw the shift mechanism. Yet another advantage is that a relatively long throw is provided on the lever, so that, again, shifting is a positive action and not accidental, with a strong feedback force, so the user knows he is throwing the shift mechanism.

The invention mechanism also provides means to trap the rod, and provides a lever which is both easy to reach and easy to use. The trapped rod assures that the shift mechanism will not fall out of the tool housing. In operation, the operator moves the handle 180°, in either direction (the reversible operation feature being yet another advantage of the invention) in order to change mode of operation. At the end of the travel the detenting mechanism snaps the entire mechanism home, and a relatively strong force is required to overcome this spring detent in order to move the lever in the opposite direction.

Another advantage of the invention mechanism, in conjunction with the ability to move the handle either way thus facilitating the convenience of the operator, is that the spring which provides the biasing force on the detent applies equal force in either direction to hold the mechanism in either position. Thus, a uniform snap action is provided regardless of the direction of lever rotation. A corollary advantage is that the rather substantial vibration to which hammers are subjected in use has no effect on the shift mechanism, because of this strong spring detenting and snap action. Yet another advantage of the invention shifter is that the parts are so configured that at no time does any part of the shift mechanism, as opposed to the gear which is shifted, contact a rotating part. Thus, the invention mechanism is protected from wear which would occur if the shifting parts were in contact with moving parts.

The invention was developed for and is being used in the environment of power tools. In the successfully constructed embodiment, the invention shift mechanism was used with a specially designed slip clutch. In this particular hammer, the motor shaft axis and the axis of the hammer and tool are spaced apart and parallel. The invention shift mechanism is disposed on a shaft between these two lines, and at right angles thereto. The shifter operates a flange on a member which has clutch teeth at one end and a pinion at the other end. This clutch-flange-pinion member is mounted on the armature shaft of the motor driving the tool. When the clutch teeth are disengaged, it idles on the armature shaft.

A number of improved features are provided around this portion of the invention. Among these advantages and features are means to prevent an overtorque from injuring the operator or tearing the tool from his hands, an adjustable force on the slip clutch with means to readily change the force of this clutch, improved locking means using only slightly modified standard parts to hold the fixed part of the slip clutch on the armature shaft, improved lubricating means between the moving and idling parts of the rotation clutch and the motor armature shaft, and an arrangement wherein the entire gear train between the pinion of the rotation clutch and the rotating part of the tool are at rest whenever the rotation clutch is disengaged. In summation of this last feature and advantage of the invention over the prior art, the invention shift mechanism operates to totally disengage the armature shaft from the hammer's rotation mechanism. This is an improvement over the prior art where the disengagement occurs either at the end of the gear train and the rotating part, or else at some point within the transmission itself, in which cases part or all of the transmission continues to operate even when it is doing no useful work.

The above and other advantages of the invention will be pointed out or will become evident in the following detailed description and claims, and in the accompanying drawing also forming a part of the disclosure, in which;

FIGS. 6 and 7 are companion views showing the rotation clutch in engaged and disengaged positions, respectively, and certain other parts.

Figure 1:
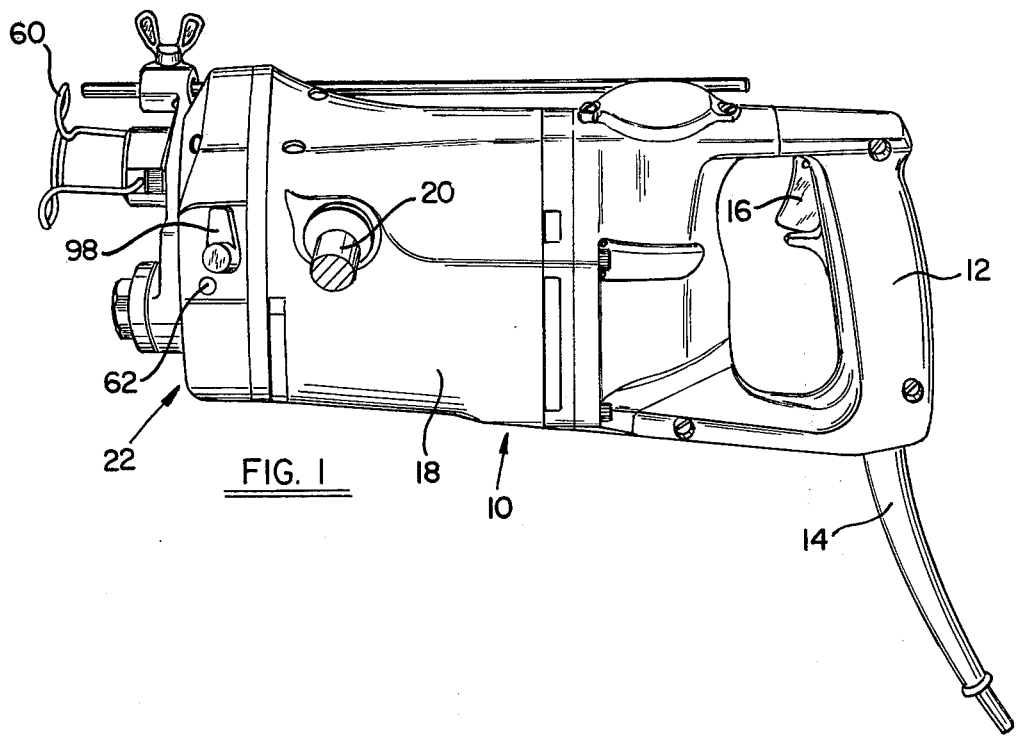
FIG. 1 is a partially prospective side view of a rotary hammer embodying the invention.

Referring now in detail to the drawings, reference numeral 10 indicates an electrical rotary hammer embodying the invention. Hammer 10 comprises an end handle 12 having a power cord 14 and a trigger 16. The mid-section of the tool comprises a motor field case 18 having a side handle 20. Finally, the tool comprises a front end housing assembly 22. Except for the invention shift mechanism and slip clutch described in greater detail below, the hammer 10 is conventional, and a more detailed explanation of its various parts can be found in many places, for example, U.S. Pat. No. 3,203,490 entitled "Compact Rotary Hammer" by George W. McCarty and Harold O. Short, and assigned to the same assignee as the present invention.

Figure 2:
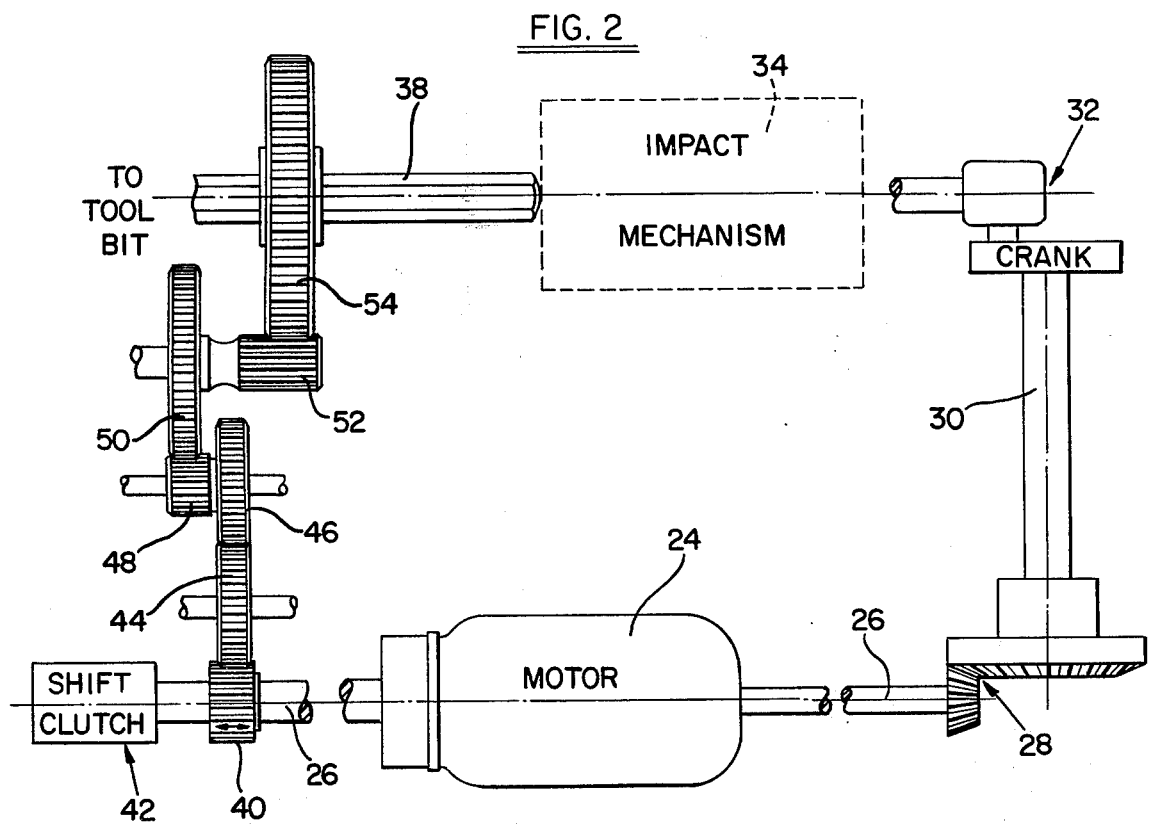
FIG. 2 is a schematic diagram of the operating linkages therein.

Referring to FIG. 2, the power trains in the hammer 10 as well as the interaction of the invention therewith are shown schematically. The hammer 10 has an electrical motor 24, preferably of the universal type. This motor has an armature shaft 26, which drives a hypoid gear set 28 at its rear end. The output drives a crankshaft 30 which in turn drives a suitable impact mechanism 34 through a crank 32 and delivers hammering blows to a tool shank 38, the outer or forward end of which carries a tool or working bit in the conventional manner. Returning to motor 24, the opposite or forward end of the motor shaft 26 is used to provide rotating motion to the tool shank 38, as opposed to the rear end of the shaft which is used to deliver hammering blows, as described above. The forward end of the armature shaft carries a pinion 40 forming part of the shift and clutch mechanism 42 of the invention. A train of gear and pinions 44 through 54 delivers the power from the pinion 40 to the tool shank 38. Suitable means, indicated schematically in the upper left of FIG. 2, insulate the gear train from the hammer blows, in a known manner. The gear train serves to reduce the speed of the motor as delivered to the shank 38, to increase the torque, and to assure the desired direction of rotation of the tool.

Figure 3:
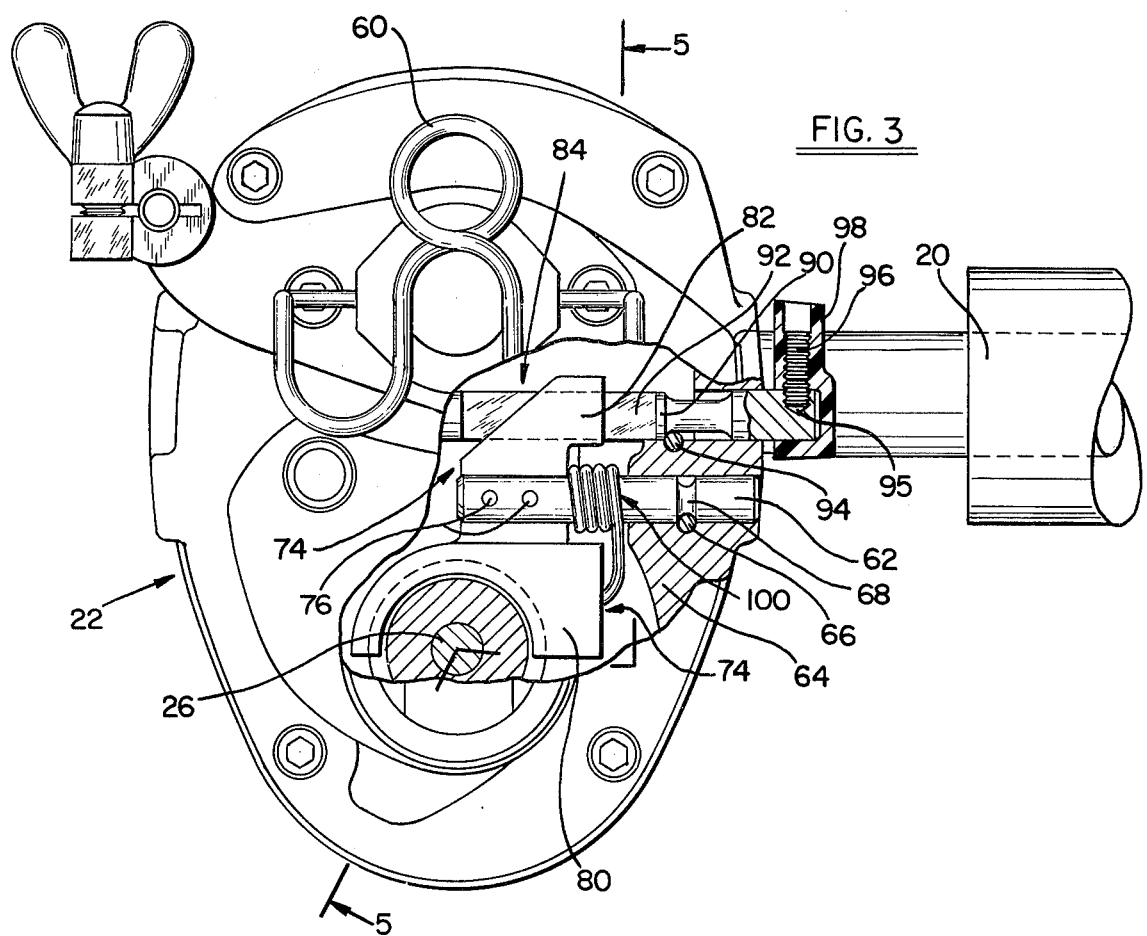
FIG. 3 is a front elevational view of the hammer of FIG. 1 partially broken away and showing a first embodiment of the invention shifter.
Figure 5:
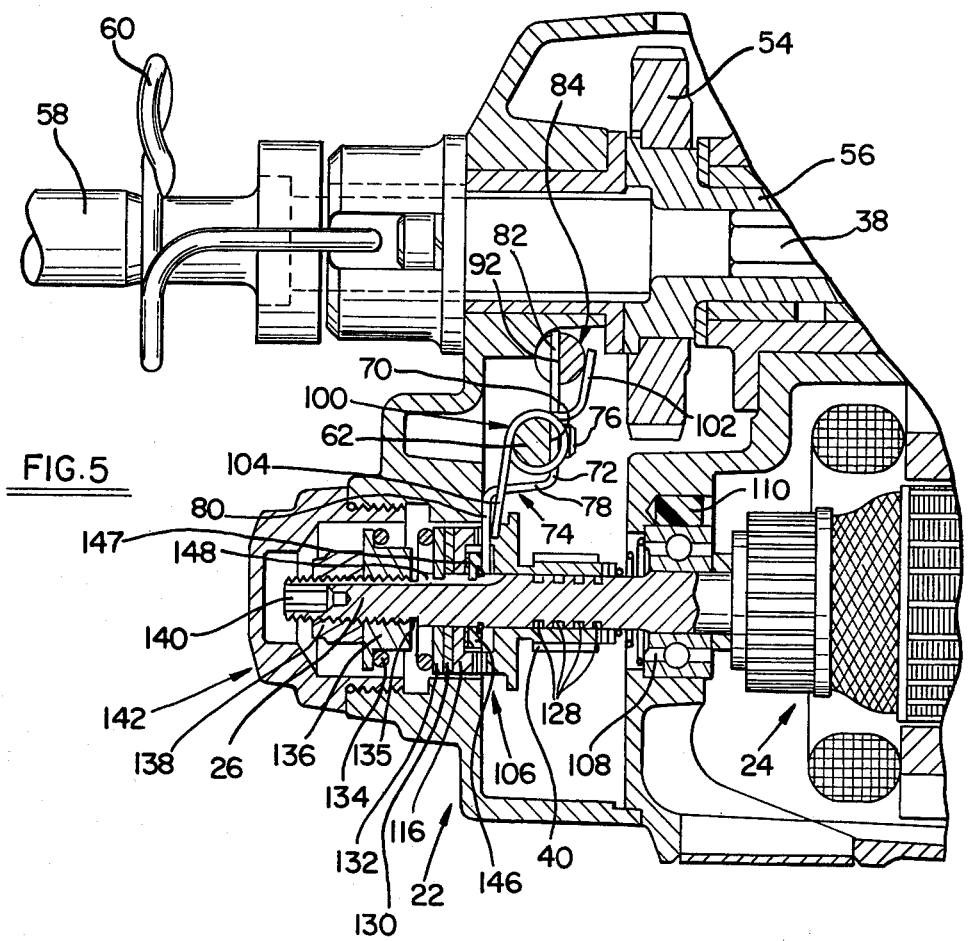
FIG. 5 is a cross-sectional view taken on line 5—5 of FIG. 3.

Referring now in detail to FIGS. 3 and 5, the front end 22 of the successfully constructed embodiment is shown in detail. Referring to FIG. 5, a spindle or sleeve 56 fixedly mounts the gear 54 on its outside, and is formed on its inside with a non-round, preferably hexagonal shape to cooperate with the shank 38, whereby the gear 54 will rotate the shank 38. The tool bit 58 proper is held by a conventional retainer 60.

Referring now simultaneously to FIGS. 3 and 5, the invention shift mechanism comprises a pivot or rock shaft 62 which is mounted in an enlarged portion 64 of the housing 22, and is free to rotate about its own axis, but is restrained against axial movement by a pin 66 fixed into the housing which is slidingly received in a groove 68 in the shaft 62. The inside end of pivot shaft 62 is flattened as at 70. The middle web 72 of a shifter member 74 is fixed to said flat 70 by means of a pair of screws 76, or other suitable fastening means, such as roll pins or the like. In addition to such more or less conventional fastening means, the function could also be accommodated by a rigidly mounted member, corresponding to the rock or pivot shaft 62, and other means, such as a dimple and groove, or a dowel and slot, to permit the necessary motion of the shifter member 74. Below middle web 72, member 74 comprises a forwardly generally horizontally disposed web 78, at the forward end of which the member comprises an operating end 80, which operates the rotation clutch, as will be described below. Finally, member 74 comprises a top end 82 which cooperates with the shifter operating rod 84. Rod 84 is slidably and rotatably mounted in a suitably formed opening in enlarged portion 64, and in a similar opening in the opposite wall 86 of the housing 22 (see FIG. 4). Rod 84 is formed with a reduced diameter neck portion 88 of predetermined axial length, and a collar 90 separates the neck from a flat 92. The flat 92 cooperates with the top end 82 of the shifter member 74. A pin 94 is fixedly mounted in enlarged portion 64, and defines the limits of axial travel, left and right, of the rod 84 by fitting into the reduced diameter neck portion 88. At its opposite ends, the rod is formed with a pair of openings 95, which cooperate with a set screw 96 in the lever 98. A torsion spring 100 is coiled about the rock shaft 62, has an upper leg 102 which bears on operating rod 84 opposite the top end 82 of the shift member, and a lower leg 104 which bears against the back side of the operating end 80 of the shift member. In this manner, shifter 74 is biased clockwise about the axis of rock shaft 62 as viewed in FIG. 5, and biased always with its top end 82 against the operating member 84 in the vicinity of the flat 92.

Member 84, as shown, has the form of a rod or shaft disposed parallel to rock shaft 62. However, the function could as well be provided by other forms of members to move the shift member 74, such as a cam, or lever, or other equivalent means.

In operation of the shifting mechanism as thus far described, the user need only turn the lever 98, from outside the casing, 180° so that it is pointing down instead of up, which brings the round side of the operating rod 84 into contact with the top end 82 of the shifter member 74. As shown in FIGS. 6 and 7, this rotates the entire shifter member about the axis of the rock shaft 62, which moves the operating end of the shifter member to the right to thereby disengage the clutches. The throw of the shifter member is a function of the thickness of the operating rod 84 at the vicinity of the flat, in conjunction with the distances between that flat and the axis of the pivot shaft, and the distance between the axis of the pivot shaft and the operating end.

Thus, the operating rod naturally moves 180° only between its two positions. This is so because the flat 92 acts as a detent either against the spring leg 102 or against the top end 82 of the shifter member 74. However, other detent means could be provided, such as a cam surface, or a concavity, or the like, in lieu of flat 92. For this reason, the rod will naturally take one or the other of these two positions. The force provided by the torsion spring 100 insures that the shift mechanism will come to rest in one or the other of these two stop positions, and will not come to rest at any intermediate position. If the mechanism were delicately balanced at an intermediate position, the force of the spring would "snap" the mechanism into one or the other of the stop positions in response to the slightest motion. Thus, the spring and the flat together, or their equivalents, comprise the invention detent means.

Figure 4:
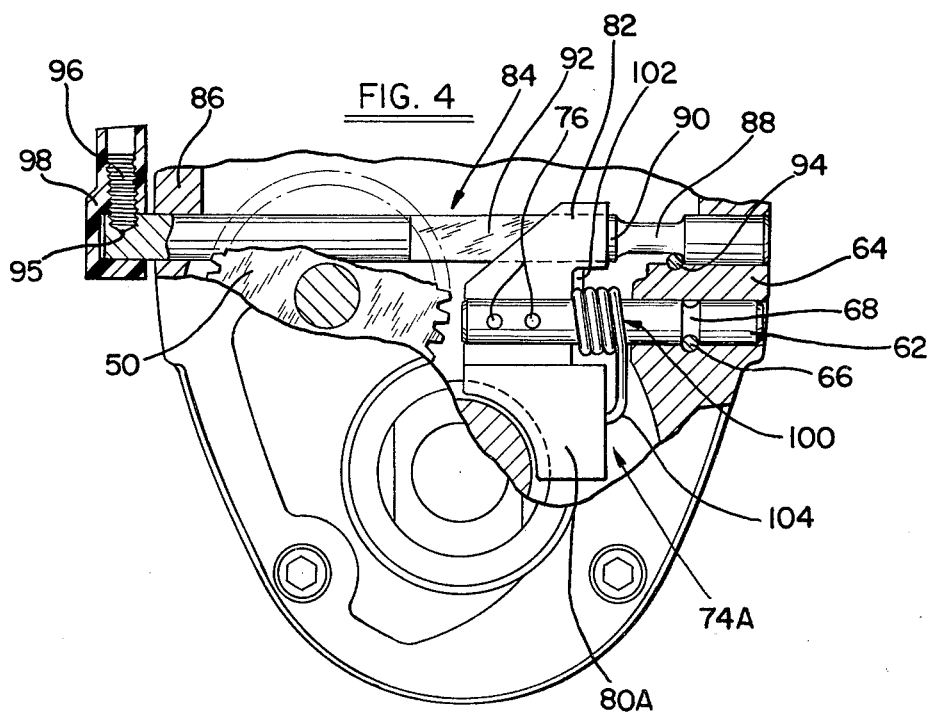
FIG. 4 is a view similar to the lower part of FIG. 3 showing another embodiment of the invention shifter and the lever reversing feature.

The relatively simple manner in which the invention accommodates righthanded and lefthanded operators is shown clearly by a comparison of FIGS. 3 and 4. The operator need only loosen the set screw 96, remove the lever 98 from that end of the operating shaft 84, push the operating shaft to the opposite side, and reconnect the lever to the second end. The interaction of the fixed pin 94 with the reduced diameter neck portion assures that the rod 84 can be moved only between the stops defined by the length of the neck, which distance, of course, is predetermined so that just the right amount of free end will extend for attachment of the lever to the shaft, while at the same time preventing the shaft from being completely removed from the housing. The cylindrical neck 88, of course, also permits the operating rod 84 to be turned freely about its own axis, in either direction, that is, rotation either clockwise or counterclockwise about the axis of the operating rod 84.

FIG. 4 also illustrates a modified shifter member 74a. Parts which are the same as shifter member 74 shown in the other drawings are indicated by the same reference numeral. The difference resides primarily in the modified operating end 80a. The operating end 80 has two points at which it contacts the clutch because it encircles approximately half of the clutch operating flange. Thus, when the clutch is disengaged, the two bottom points on the operating ends contact the flange 120. In the FIG. 4, 80a embodiment, there is a tradeoff between compactness and having only one point contact on the clutch when in the disengaged position. The 80a embodiment was in fact successfully built because the particular transmission housing in which it was used was extremely tightly packed with other parts and there was not sufficient room for the FIG. 3 embodiment. The difference is primarily one of engineering practice and conditions, the effect on operation is virtually indistinguishable.

The arrangement of the operating rod above the rock shaft with the shift member fixed to the rock shaft yields a number of advantages for the invention shift mechanism. These advantages become more apparent when an alternate structure, not preferred, is considered. It might be suggested that the pivot or shaft 62 could simply be extended out to one side, and the lever 98 fixed thereto. Then, the upper leg 102 of the torsion spring 100 could be arranged to rest against some rigid part of the housing, and the entire operating rod 84 and its associated parts could be omitted. Such a modified structure would be highly undesirable because the advantageous moment arm of the upper leg 82 of the shifter member would be lost. Thus, with the arrangement as shown, the amount of force required to operate the shift mechanism can be predetermined by a combination of the strengths of the shift and torsion springs, and the distance between the axes of the rock shaft and the operating rod. Thus, the arrangement of the invention shown in the drawing is much more versatile than a mechanism where the shift device is operated directly by the operator. In the tool for which the invention was developed, if the rock shaft 62 were turned directly, then the advantage of 180° swing, the advantage of either direction operation, and the advantage of snap-action, would all be lost.

The invention rotation clutch assembly 106 is mounted on the armature shaft 26. A ball bearing 108 is press fitted on the armature shaft, and the other race is prevented from turning by a plug 110 mounted in a suitable internal wall of the tool. The commutator end of the motor 24 is supported in this bearing, as are all of the remaining parts on the shaft including the rotation clutch assembly 106. Bearing 108 is of a known type having an integral non-rotating dust shield 112.

The rotation clutch assembly 106 is built around a pair of clutch members 114 and 116. Member 114 comprises and is formed integrally with the pinion 40, which is the driving member for the gear train to rotate the tool bit 58, as described above. To the left of the pinion 40, member 114 comprises an undercut 118, the flange 120 which cooperates with the operating end 80 or 80a of the shifter mechanism, and is finally completed by a cylindrical portion formed with the clutch teeth 122. The undercut 118 serves to facilitate tooth formation.

Member 114 is spring biased to the left, into clutching engagement with member 116, by a conical spring 124, which has its enlarged end against the bearing shield 112, and which has its smaller diameter end bearing against a pair of slip discs 126 and 127 interposed between the spring and the pinion 40. To facilitate and lubricate the rotation of the member 114 with respect to the armature shaft 26 when the clutch is disengaged, shaft 26 is formed with a plurality of shallow cutout grooves 128. These grooves are of rectilinear cross-sectional shape as shown in the drawing, are relatively shallow, and four in number were provided in the successfully constructed embodiment. These grooves are filled with a suitable lubricant in use. As to the shape and number of the grooves, the important factors are strength of the shaft, support surface for the pinion, and total volume of lubricant when applying the invention to other environments. For example, one relatively wide and relatively deep groove might be practical elsewhere, or other combinations could be used.

The companion clutch member 116 is simple in configuration, comprising a disc formed with a through opening for the armature shaft, clutch teeth 122 identical to the clutch teeth 122 on the member 114, but, of course, reversed left to right, and provided with a finished surface at its opposite end (left side). A pair of slip discs 130 and 132 are interposed between the finished face of the clutch member 116 and a relatively strong spring 134. A flanged guide member 136 confines the spring 134 between its flanged portion and the slip disc 132. A shoulder 135 on the armature shaft defines the right-most position of the member 136. Member 136 has a cylindrical portion which surrounds the armature shaft and guides the coils of the spring 134. An adjustable lock nut 138 is provided on the threaded outer end of the armature shaft 26, and defines the relative position of the flange portion of the member 136 with respect to the slip disc 132, and thus, of course, also defines the degree of compression of the spring 134. The free end of the armature shaft is provided with a relatively large hex or Allen type socket 140. Access can be had to this socket via a protective cap 142 (see FIG. 5) suitably sealingly and threadedly attached to the housing 22.

Improved means are provided to hold the clutch member 116 on the shaft, and to prevent it from moving to the right beyond its predetermined position, as shown in the drawings. To this end, a suitable lock member such as spring ring 144 is fitted into a suitably formed groove in the motor shaft. A key washer 146 and a slip disc 147 are interposed between the inside surface of the clutch member 116 and this lock member 144. Key washers are known in the art, and comprise an ordinary washer having an additional tab or key on the inside which is fitted into a suitably formed keyway 148 (see FIG. 5) in the shaft, whereby the washer rotates with the shaft. The improvement resides in an undercut in the key washer which encompasses the ring 144. Absent this undercut which confines the ring 144, it is highly likely that the vibration to which the clutch and the tool generally are subjected in use would shake the ring loose from its slot in the shaft, thereby permitting the clutch member 116 under the influence of the spring 134 to move to the right, compressing the relatively much lighter spring 124. In this manner, it is likely that the clutch could never be disengaged. Other types of lock members 144, such as a square cross-sectional shape ring member, could also be used, as is clear to those skilled in the art.

The parts 130 through 138, together with key washer 146 and disc 147, comprise the essential parts of an adjustable over-torque slip feature of the invention clutch. The slip members 132 and 146 are keyed to the shaft 26, thus assuring that they will rotate with the shaft along with the parts 134, 136 and 138. In order to adjust the tension of the spring, and hence the torque at which slippage will occur, the operator need only remove the protective cap 142, insert an Allen wrench in the socket 140, and then adjust the position of the nut 138 and the guide member 136 with respect to the clutch member 116. Of course, as is known, over-torque protection is required since rotary hammers can strike hard or immovable objects, such as metal reinforcing rods, in concrete. Such a chance occurrence would cause a sudden stoppage of the tool which in turn could cause injury to the operator due to the tool flying from his hands, tool breakage, and the like.

When the clutch teeth 122 are engaged, the pair of slip discs 126 and 127 take up the relative motion between the non-rotating shaft bearing shield 112 and the rotating clutch member 114. A comparison of FIGS. 6 and 7 graphically illustrates the advantage of using a conical type spring 124. The coils of the spring nest within each other when the clutch is disengaged, as shown in FIG. 7, whereby the spring could occupy an axial length equal to only one coil, or the thickness of the spring wire.

Since the shaft idles within the clutch part 114 when the clutch is disengaged, the grooves 128, filled with lubricant, aid in preventing any galling or high wear between these two parts. Further, clutch member 114 is preferably made of some good bearing material, a high graphite tool steel was used in the successfully constructed embodiment. Other bearing materials, such as oil impregnated sintered steel, or the like, could also be used, all as is well known to those skilled in the art.

While the successfully constructed embodiment shown in the drawing comprised nine clutch teeth 122 on each clutch member, the number of teeth is thought to be critical. The number of teeth shown was chosen as a matter of convenience, more or fewer teeth could also be used, consistent with good clutch design practice.

The number of grooves 128, similarly, is not critical. An important criteria is that the pinion always covers all of the grooves in all positions of the pinion. If a groove should become uncovered during operation, the high speed of the armature shaft would rapidly fling the lubricant from that groove, thus possibly creating a condition of high wear, due to "dry" operation thereafter.

While the invention has been described in detail above, it is to be understood that this detailed description is by way of example only, and the protection granted is to be limited only within the spirit of the invention and the scope of the following claims.

We claim:

1. A portable power tool including an elongated housing having handle means at one end, a motor in said housing, output means at the other end of said housing, a drive train connecting said motor and said output means, said drive train including disengageable clutch means, a manually operable operating rod extending transversely of and supported by said housing and operable to selectively engage and disengage said clutch means, said operating rod being movable axially of its length to extend selectively from opposite sides of said housing, whereby to facilitate easy right and left hand operation of said operating rod and said clutch means.

2. A portable power tool including an elongated housing having handle means at one end, a motor in said housing, output means at the other end of said housing, a drive train connecting said motor and said output means, said drive train including disengageable clutch means, a rock shaft supported by said housing for rotation about its own axis, a shift member rotatable with said rock shaft and having a first portion engageable with said clutch means, a manually operable operating rod extending transversely of and supported by said housing and engageable with a second portion of said shift member and operable to rotate said rock shaft to selectively engage and disengage said clutch means, said operating rod being movable axially of its length to extend selectively from opposite sides of said housing, whereby to facilitate easy right and left hand operation of said operating rod and said clutch means.

3. A portable power tool including an elongated housing having handle means at one end, a motor in said housing, output means at the other end of said housing, a drive train connecting said motor and said output means, said drive train including disengageable clutch means, a rock shaft supported by said housing for rotation about its own axis, a shift member rotatable with said rock shaft and having a first portion engageable with said clutch means, a manually operating rod extending transversely of and supported by said housing and having a cam surface engageable with a second portion of said shift member and operable to rotate said rock shaft to selectively engage and disengage said clutch means, spring means normally biasing said shift member first portion into engagement with said operating rod, said operating rod cam surface forming detent means operable to hold said shift member in a first and second position corresponding to engagement and disengagement of said clutch means, said operating rod being movable axially of its length to extend selectively from opposite sides of said housing, whereby to facilitate easy right and left hand operation of said operating rod and said clutch means.

4. A portable power tool including an elongated housing having handle means at one end, a motor in said housing, output means at the other end of said housing, a drive train connecting said motor and said output means, said drive train including disengageable clutch means, a manually operable operating rod extending transversely of and supported by said housing and operable to selectively engage and disengage said clutch means, detent means operable to releasably hold said operating rod in a first and second position corresponding to engagement and disengagement of said clutch means, said operating rod being movable axially of its length to extend selectively from opposite sides of said housing, whereby to facilitate easy right and left hand operation of said operating rod and said clutch means.

5. A portable power tool including an elongated housing having handle means at one end, a motor in said housing, output means at the other end of said housing, a drive train connecting said motor and said output means, said drive train including disengageable clutch means, a rock shaft supported by said housing for rotation about its own axis, a shift member rotatable with said rock shaft and having a first portion engageable with said clutch means, a manually operable operating rod extending transversely of and supported by said housing and having a cam surface engageable with a second portion of said shift member and operable to rotate said rock shaft to selectively engage and disengage said clutch means, spring means normally biasing said shift member first portion into engagement with said operating rod, said operating rod cam surface forming detent means operable to hold said shift member in a first and second position corresponding to engagement and disengagement of said clutch means, said detent means comprising at least one flat formed on said operating rod and engaged by said shift member first portion, said operating rod being movable axially of its length to extend selectively from opposite sides of said housing, whereby to facilitate easy right and left hand operation of said operating rod and said clutch means.

6. An improved shifting mechanism, the combination comprising a rock shaft mounted for rotation about its own axis, a shift member secured to said rock shaft and having a first end and a second end, an operating member in spaced relation to said rock shaft, said operating member comprising detent means adapted to cooperate with said first end of said shift member, and said second end of said shift member being adapted to cooperate with other means, said detent means comprising spring means for urging said shift member first end into contact with said operating member, said spring means comprising a torsion spring having its coils about said rock shaft, said torsion spring having a first end bearing against said operating member in the vicinity of contact between said shift member and said operating member, and said torsion spring having a second arm bearing against said second end of said shift member.

7. An improved shifting mechanism, the combination comprising a housing, a rock shaft mounted inside said housing for rotation about its own axis, a shift member secured to said rock shaft and having a first end and a second end, an operating member in spaced relation to said rock shaft, said operating member comprising an operating rod, and means to mount said operating rod in said housing for rotation about its own axis, said operating member including detent means adapted to cooperate with said first end of said shift member, said detent means comprising a flat formed on said rod whereby said shift member is rotated a distance proportional to the depth of said flat into said operating rod when said operating rod is rotated 180° from said flat to the rounded side of said rod opposite said flat.

8. An improved shifting mechanism, the combination comprising a housing, a rock shaft mounted within said housing for rotation about its own axis, a shift member secured to said rock shaft and having a first and a second end, an operating member in spaced relation to said rock shaft, said operating member comprising an operating rod, means to mount said operating rod in said housing for rotation about its own axis, said operating member including detent means adapted to cooperate with said first end of said shift member, said second end of said shift member being adapted to cooperate with other means, means to mount said operating rod in said housing for additional motion along its longitudinal axis, said operating rod mounting means comprising a pair of opposed openings formed in said housing, said operating rod having a length a predetermined amount longer than the distance between the outside ends of said opposed openings in said housing, stop means to define the limits of axial motion of said operating rod within said housing, whereby at least a portion of one end or the other end of said operating rod extends out to one side or the respective other side of said housing.

9. The combination of claim 8, said stop means comprising a reduced diameter neck portion formed on said operating rod and of a predetermined length, and a pin fixed in said housing and cooperable with said reduced diameter neck portion to permit an amount of axial motion of said operating rod substantially equal to the axial length of said reduced diameter neck portion.

10. In a portable electric tool, a transmission housing, a rock shaft mounted inside said transmission housing for rotation about its own axis, a shift member secured to said rock shaft and having a first end and a second end, an operating rod mounted in said transmission housing for rotation about its own axis, said operating rod including detent means adapted to cooperate with said first end of said shift member, said second end of said shift member being adapted to cooperate with a transmission gear in said housing, said gear being formed with a flange portion, said second end of said shift member being formed in a part-circular configuration for contacting said flange, whereby said second end of said shift member contacts said flange at at least one point when the second end moves said flange.

11. In a portable electric tool, a transmmission housing, a rock shaft mounted inside said transmission housing for rotation about its own axis, a shift member secured to said rock shaft and having a first end and a second end, an operating rod mounted in said transmission housing for rotation about its own axis, said operating rod including detent means adapted to cooperate with said first end of said shift member, said second end of said shift member being adapted to cooperate with a transmission gear in said housing, said rock shaft being located between said operating member and the axis of said gear, and said first and said second ends of said shift member extending to opposite sides of the axis of said rock shaft.

12. In a portable power tool having rotary drive means controlled by clutch means, the combination comprising shift means positioned out of contact with said clutch means in a first condition of said clutch means, means manually operable either right-handedly or left-handedly and externally of said power tool, said manually operable means comprising an operating rod, means to permit said operating rod a predetermined amount of axial motion, said permitting means comprising a reduced diameter neck portion formed in said operating rod and stop means cooperable with said reduced diameter neck portion to define the limits of axial motion of said operating rod, said operating rod having a predetermined length such that one end or the other end thereof will always extend out from said tool, and a manual lever cooperable with said one or the other extending end of said operating rod, whereby said tool is readily accommodated to use by right-handed or left-handed users, and said shift means comprising a portion adapted to contact and move said clutch means from said first condition to a second condition thereof.

13. In a portable power tool having a rotary drive means controlled by clutch means, the combination comprising a rock shaft mounted in said housing for rotation about its own axis, shift means positioned out of contact with said clutch means in a first condition of said clutch means, said shift means comprising a shift member fixed to said rock shaft, means manually operable either right-handedly or left-handedly and externally of said housing, said manually operable means comprising a portion adapted to move said shift means in both said right-handed and left-handed modes of operation, said shift means comprising a portion adapted to contact and move said clutch means from said first condition to a second condition thereof, and a torsion spring having its coils wrapped about said rock shaft and having a first arm cooperable with said manually operable means, and said torsion spring having a second arm bearing against said shift member.

14. In combination, a shift member mounted for rotation about a first axis, said shift member having first and second ends extending to opposite sides of said first axis, an operating member mounted for rotation about a second axis, said second axis being in spaced relation and parallel to said first axis, and detent means for moving said first end of said shift member.

15. The combination of claim 14, said operating member comprising an operating rod, spring means for urging said first end of said shift member into contact with said operating rod, said detent means comprising a flat formed in said contacting portion of said operating rod, whereby said shift member is rotated about said first axis a distance proportional to the depth of said flat into said operating rod when said operating rod is rotated 180° from said flat to the rounded side of said operating rod opposite said flat.

16. The combination of claim 15, said first axis being defined by a rock shaft mounted in said housing for rotation about its own axis, said spring means comprising a torsion spring having its coils about said rock shaft, said torsion spring having a first end bearing against said operating rod in the vicinity of said flat and opposite the area of contact between said shift member and said operating member, and said torsion spring having a second arm bearing against second end of said shift member.

17. The combination of claim 14, spring means for urging said first end of said shift member into contact with said operating member, wherein said shift member, operating member, and spring means are in the transmission housing of a portable electrical tool, said second arm of said shift member being cooperable with a gear of the transmission in said housing, and said first axis being defined by a rock shaft mounted in said housing for rotation about its own axis.

18. The combination of claim 17, said operating member comprising an operating rod, means to permit said operating rod a predetermined amount of axial motion, said permitting means comprising a reduced diameter neck portion formed in said operating rod and stop means cooperable with said reduced diameter neck portion to define the limits of axial motion of said operating rod, said operating rod having a predetermined length such that one end or the other end thereof will always extend out from said housing, and a manual lever cooperable with said one or the other extending end of said operating rod, whereby said tool is readily accommodated to use by righthanded or left-handed users.

19. The combination of claim 17, said gear comprising a flange portion, and said first end of said shift member comprising a part-circular portion adapted to contact at least one point on said gear flange portion.

20. In an electrical tool, the combination comprising a motor shaft, a transmission driven by said shaft, clutch means interconnecting said shaft and said transmission, said clutch means comprising a first clutch member rotatably and slidably mounted on said shaft and a second clutch member, means to locate said second clutch member in a predetermined axial position on said shaft and for rotation with said shaft, spring means for urging said first clutch member into engagement with said second clutch member, said first clutch member comprising a pinion portion engaged with said transmission and a flange portion, shift means cooperable with said flange portion to move said first clutch member axially on said shaft and out of engagement with said second clutch member, said shift means comprising a shift member rotatably mounted in the housing of said tool and having a first portion cooperable with said flange portion of said first clutch member, said shift member having a second portion, said shift means further comprising an operating member mounted for motion in said housing, and spring means for urging said shift member second portion into engagement with said operating member, whereby a predetermined motion of said operating member causes a corresponding motion of said shift member which in turn moves said first clutch member into or out of engagement with said second clutch member.

21. The combination of claim 20, said first portion of said shift member comprising a semi-circular portion adapted to contact at least two points on said flange portion.

22. The combination of claim 20, said first portion of said shift member comprising a quarter-circular portion adapted to contact one point on said flange portion.

23. The combination of claim 20, said means to locate said second clutch member on said shaft comprising a key washer having its key portion engaged in a keyway formed in said shaft, a lock member seated in a suitably formed groove in said shaft, and said key washer being formed with a recess to receive at least a substantial portion of said lock member, whereby said lock member is held trapped in its said groove in said shaft by said recess in said key washer.

24. The combination of claim 20, at least one recess formed in said shaft in the vicinity of said first clutch member, said recess being so located on said shaft that it is covered by said first clutch member in both the engaged and disengaged positions of said first clutch means, and a lubricating substance within said at least one recess.

25. The combination of claim 20, said first clutch member consisting of a metal having relatively good lubricating qualities.

26. The combination of claim 20, and slip clutch means cooperable with said second clutch member, said slip clutch means comprising a pair of slip discs arranged in tandem against said second clutch member on the side thereof remote from said first clutch member, second spring means bearing against said slip discs, a guide member cooperable with said second spring means, and lock means adapted to define the axial location of said guide member on said shaft with respect to said second spring means and said slip discs, whereby the pressure force of said second spring means against said slip discs can be predetermined by changing the axial position of said lock means and said guide member on said shaft.

27. The combination of claim 20, said operating member comprising a rod formed with a flat for engagement with said end of said shift member, whereby said operating end of said shift member is moved a distance proportional to the depth of said flat into said operating rod when said operating rod is rotated 180° from said flat to the rounded side of said operating rod opposite said flat.

28. The combination of claim 27, a rock shaft, means to mount said rock shaft in said housing for rotation about its own axis, means to fix said shift member to said rock shaft, and a torsion spring having its coils wrapped about said rock shaft and having a first arm bearing against said operating rod in the vicinity of said flat, and said torsion spring having a second arm bearing against said first portion of said shift member, whereby said torsion spring urges said shift member against said operating rod and urges said first clutch member away from said second clutch member.

29. The combination of claim 28, the axis of said rock shaft and of said operating member being disposed parallel to each other and at right angles to the axis of said shaft.

30. The combination of claim 28, said rock shaft being located between said operating rod and said shaft, and said shift member having said first and second portions extending to opposite sides of said rock shaft.

31. The combination of claim 28, said means to mount said rock shaft in said housing comprising a closed circumferential groove formed in said rock shaft and a pin fixed in said housing and received in said groove.

32. The combination of claim 27, a pair of opposed through openings formed in said housing and adapted to receive the opposite ends of said operating rod, said operating rod having a total axial length a predetermined amount longer than the distance between the outside ends of said pair of opposed through openings, said operating rod being formed with a reduced diameter neck portion of predetermined axial length, a stop pin fixed in said housing and cooperable with said reduced diameter neck portion, and a lever member including means to fix said lever member to either exposed end of said operating rod, whereby both right handed and left handed users of said tool are accommodated by fixing said lever member to one or the other of said exposed ends of said operating rod.

* * * * *